United States Patent
Shukla et al.

(10) Patent No.: US 10,417,284 B2
(45) Date of Patent: Sep. 17, 2019

(54) AVAILABLE, SCALABLE, AND TUNABLE DOCUMENT-ORIENTED STORAGE SERVICES

(71) Applicant: Microsoft Technology Licensing, LLC, Redmond, WA (US)

(72) Inventors: Dharma Shukla, Bellevue, WA (US); Karthik Raman, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 667 days.

(21) Appl. No.: 13/827,719

(22) Filed: Mar. 14, 2013

(65) Prior Publication Data
US 2014/0279844 A1 Sep. 18, 2014

(51) Int. Cl.
*G06F 16/00* (2019.01)
*G06F 16/93* (2019.01)

(52) U.S. Cl.
CPC .................................. *G06F 16/93* (2019.01)

(58) Field of Classification Search
None
See application file for complete search history.

(56) References Cited

U.S. PATENT DOCUMENTS

| | | | | |
|---|---|---|---|---|
| 8,352,444 | B1* | 1/2013 | Chang | G06F 12/1408 707/693 |
| 8,364,788 | B2 | 1/2013 | Lomelli | |
| 8,935,493 | B1* | 1/2015 | Dolan et al. | 711/161 |
| 2001/0020255 | A1 | 9/2001 | Hofmann | |
| 2002/0068559 | A1* | 6/2002 | Sharma et al. | 455/423 |
| 2003/0061352 | A1* | 3/2003 | Bohrer et al. | 709/226 |
| 2005/0244007 | A1* | 11/2005 | Little et al. | 380/270 |
| 2006/0271544 | A1* | 11/2006 | Devarakonda | G06F 9/5027 |
| 2007/0006321 | A1* | 1/2007 | Bantz | G06F 21/6218 726/27 |
| 2007/0201655 | A1 | 8/2007 | Shenfield | |

(Continued)

OTHER PUBLICATIONS

Root.; "CouchDB: The Document Data Store". http://www.vskills.in/certification/article/couchdb-document-data-store Published Dated: Aug. 17, 2011 pp. 1-2.

*Primary Examiner* — Son T Hoang
(74) *Attorney, Agent, or Firm* — Alleman Hall Creasman & Tuttle LLP

(57) ABSTRACT

An application on a device may interact with a document service that provides access to a document service. The interaction may occur in a variety of contexts, such as a device context (e.g., the document service and the application provided on the same device), a local context (e.g., via a LAN), and a remote context (e.g., over the Internet). It may be advantageous to adapt the interaction to the current context, while also providing a consistent application interface that alleviates the application from context-specific implementations, and also achieving this adaptation in a performant manner. These considerations may be achieved in a balanced manner by providing a set of runtimes, where each runtime mediates the application/document service interaction between the application and the document service in a contextually adapted manner. The device may automatically detect the context of the interaction and select a contextually suitable runtime to service the application.

20 Claims, 9 Drawing Sheets

(56) References Cited

U.S. PATENT DOCUMENTS

| | | | |
|---|---|---|---|
| 2011/0191485 A1* | 8/2011 | Umbehocker | 709/229 |
| 2012/0047517 A1* | 2/2012 | Townsend | H04M 3/5191 |
| | | | 719/313 |
| 2012/0158805 A1* | 6/2012 | Andre et al. | 707/827 |
| 2012/0240098 A1 | 9/2012 | Souza | |
| 2012/0254842 A1 | 10/2012 | Henderson | |
| 2012/0324069 A1 | 12/2012 | Nori | |
| 2014/0136782 A1* | 5/2014 | Thomas | 711/117 |

* cited by examiner

AVAILABLE, SCALABLE, AND TUNABLE DOCUMENT-ORIENTED STORAGE SERVICES

BACKGROUND

Within the field of computing, many scenarios involve the execution of an application accessing a document service providing access to a document service. The documents provided by the document service may comprise records in a structured data set, such as records in a database, object instances in an objet set, and human-readable texts, and may present variable levels of structure both within and among the document, such as a tightly defined structure defined by a schema; a loose, ad hoc structure inferred from structured content; and unstructured data. An application may access the documents of the document service by presenting a series of requests to the document service, such as requests to create, read, update, and delete documents in the document service.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In scenarios involving the interaction of an application and a document service, the interaction may occur in a variety of contexts. As a first example, the interaction may occur in a device context; e.g., part or all of the document service may be provided on the same device executing the application. As a second example, the interaction may occur in a local context, wherein a device executing the application accesses the document service over a local area network, such as an ad hoc network connecting two nearby devices; an intranet of an enterprise organization; or a virtual private network (VPN) connection established over a wide-area network. As a third example, the interaction may occur in a remote context, such as two devices communicating over the Internet. Moreover, the context of the application and the document service may change during an application session (e.g., part or all of the document service may relocate from the device to a local service, or the device may transition from a local network to a remote network).

In such scenarios, many details of the interaction between the application and the document service may not be affected by the variable context. For example, the available set of documents and the semantics of requesting create, read, update, and delete operations for one or more documents may not change between contexts. However, other aspects of the interaction may differ between two contexts, based on variations in bandwidth, latency, trust, and resource availability. As a first example, a document service operating on a device to enable document access by applications executing thereupon may implement a comparatively simple transactional model, such as a file-locking mechanism that grants exclusive access to the requesting application. By contrast, a document service that remotely interacts with applications may implement a more robust transactional model, such as a model that enables a guarantee of atomic, consistent, isolated, and durable ("ACID") transactions. As a second example, an application interacting with a remote document service may utilize a limited document cache that is oriented to contend with communication interruptions. However, an application interacting with a local document service may utilize an extensive document cache in order to accommodate the high throughput of the local area network; and an application executing on the same device as the document service may entirely omit the document cache and communicate directly with the document service. As a third example, an interaction between the application and a remote document service may be highly encrypted and authenticated to reflect a low level of trust, while an interaction between the application and a local document service may be more lightly encrypted to reflect a higher degree of trust, and an interaction between the application and a device document service may omit encryption due to an even higher trust level.

In view of these differences, it may be advantageous to configure the application and/or document service to adapt various details of the interaction to the context of the interaction. Moreover, it may be advantageous both to enable the application to access the document service in a similar manner despite these variable details (e.g., providing a single application that is capable of accessing any document service in the same manner irrespective of whether the current context comprises a device, local, or remote context), and to enable the application to discover the details of the context if desired. It may also be advantageous to provide an architecture where the adaptation of the interaction occurs in a performant manner, and with the flexibility to adjust a current session based on changes in the context of the interaction.

In view of these observations, presented herein are techniques for providing a contextualized, consistent, and flexible interaction between an application and a document service. These techniques involve a runtime architecture a set of runtimes, where each runtime mediates interaction between the application and the document service in a particular context. For example, a device service runtime may enable interaction between an application executing on a device and a document service also (partly or wholly) stored by and operating on the same device; a local service runtime may enable interaction between the application and a local area network (LAN) endpoint of the document service; and a remote service runtime may enable interaction between the application and a remote area network (WAN) endpoint of the document service. When an application requests an interaction with a document service, the device may detect the context of the interaction, select a suitable runtime from the runtime set, and connect the application with the document service through the selected runtime. Each runtime may present a consistent application interface to the application, such that the application may receive and fulfill a substantially similar set of requests, irrespective of the context of the document service. Additionally, the device may monitor the interaction to detect a contextual transition, and may transfer a current session to a second runtime that is more closely adapted to the new context. These and other advantages may be achieved according to the techniques and architectures presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
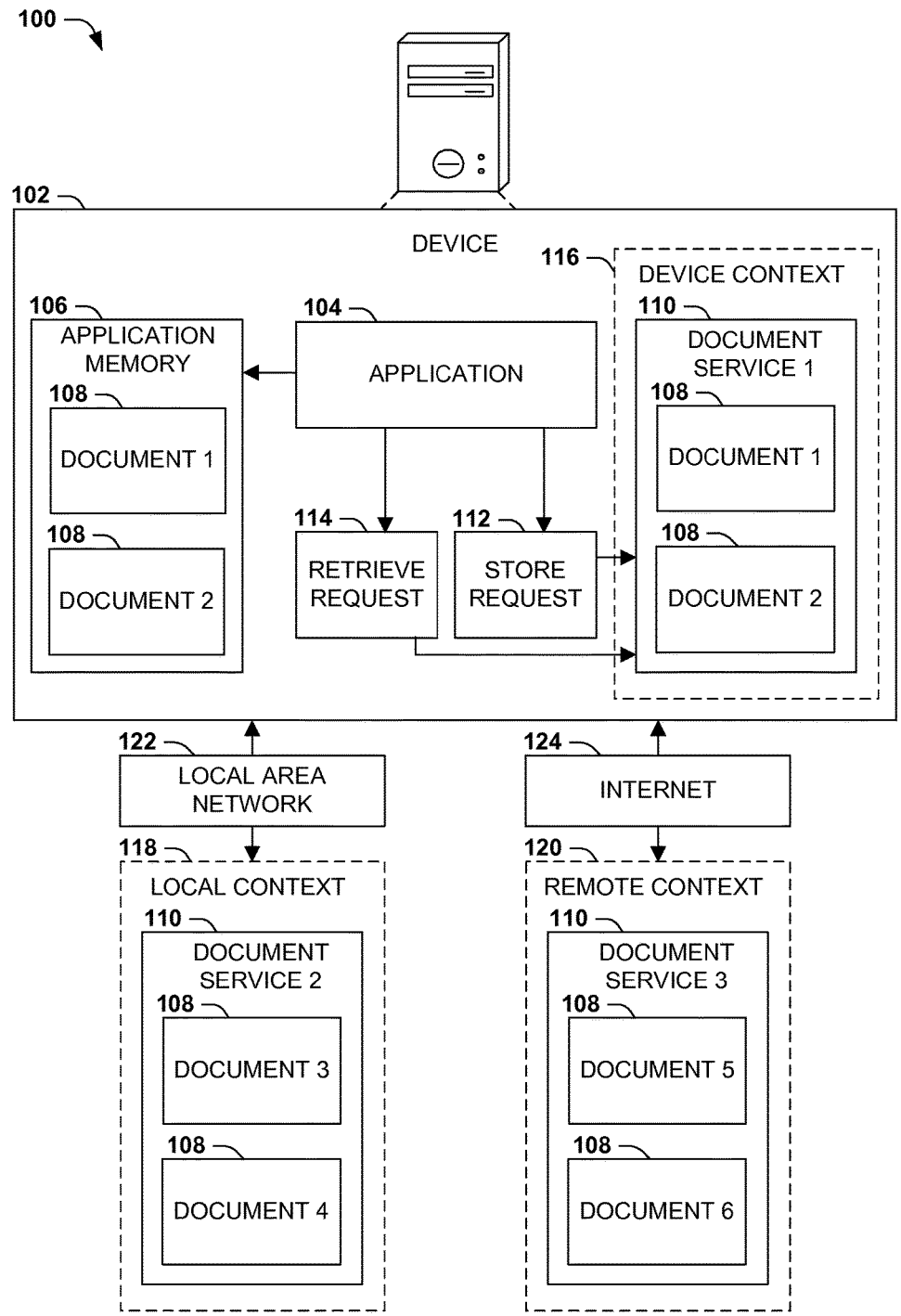
FIG. 1 is an illustration of an exemplary scenario featuring an exemplary set of interactions of an application with various document services.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve an execution on a device of an application that interacts with a document service. For example, the document service may represent a set of records in a database, or a series of data objects in various types and degrees of structure (e.g., a tightly defined hierarchy according to a extensible markup language (XML) schema; a set of objects in an object-oriented environment; or a loosely defined set of values, such as a key/value store). The application may also be executed by the device in many ways, such as a native application executing against the hardware of the device; an application built on a platform; and an application maintained by a runtime or executing within a virtual environment. The device may also interact with the document service in furtherance of various tasks, such as querying, creating, reading, updating, and/or deleting various documents within the document service, and/or managing the structure of the document service. Furthermore, the device and the document service may occupy various roles and relative permissions, such as a client/server model where the device interacts in a read/write mode, a read-only mode, or an administrative mode; or a peer-to-peer model where the device and the document service exchange documents.

In particular, the application may interact with the document service in various contexts. As a first example, the document service may be stored on and possibly isolated within the device, and provided to service applications executing on the device. As a second example, the document service may be locally available through a second local device, such as one or more servers accessible to the device on a wired or wireless local area network (LAN) or a communications bus such as a uniform serial bus (USB) connection. As a third example, the document service may be available over a wide-area network (WAN), such as the internet. The context of the interaction may significantly alter a number of aspects of the interaction of the device and the document service, such as the availability, bandwidth, latency, and security of the interaction between the application and the document service.

FIG. 1 presents an illustration of an exemplary scenario 100 featuring a device 102 executing an application 104, such as a set of instructions stored in a document memory 106. The application 104 may interact with a set of documents 108 provided by a document service 110; e.g., the application 104 may initiate a store request 112 to store a document 108 in the document service 110, or a retrieve request 114 to retrieve a document 108 from the document service 110. However, the context of the interaction between the application 104 and the document service 110 may significantly vary. As a first example, the document service 110 may be accessed in a device context 116, wherein the document service 110 is stored on the same device 102 and services one or more applications 104 executing on the same device 102. As a second example, the document service 110 and the application 104 may interact in a local context 118, such as over a local area network 122 (LAN) connecting the device 102 to a local server, such as in a workgroup or an enterprise scenario. As a third example, the document service 110 and the application 104 may interact in a remote context 120, such as over a wide-area network such as the Internet 124. Moreover, the application 104 may consecutively or concurrently interact with different document services 110 in the same or different contexts, and/or may interact with a document service 110 in two or more contexts (e.g., during an application session, an application 104 executing on a mobile device 102 may initially interact with the document service 110 in a local context 118, and may transition to a remote context 120).

In view of the various contexts in which the document service 110 and application 104 may interact, many aspects of the interaction may not be affected by the context. For example, the document service 110 may accept the same types of requests, and may provide the same documents 108 in response to various requests. However, other aspects of the interaction may significantly vary between respective contexts. As a first example, the responsiveness of the interaction (such as the bandwidth and/or latency) may vary; e.g., the document service 110 executing in a device context 116 may respond promptly to any request, while a document service 110 accessed in a remote context 120, such as over the Internet 124, may respond in a constrained manner, with significant latency and limited bandwidth. As a second example, the trustworthiness of the interaction may vary. For example, in a device context 116, the application 104 and the document service 110 may be fully trusted, and may interact with device-oriented security measures, such as process isolation. By contrast, when accessed over a local area network 122, the application 104 and document service 110 may communicate in a trusted network model, such as a workgroup or domain model; and when accessed over a wide-area network such as the Internet 124, the application 104 and document service 110 may communicate with a high degree of security, such as a high degree of encryption and a certificate-based authentication model. As a third example, the application 104 may be adapted for varying degrees of availability of the document service 110; for example, an application 104 accessing a document service 110 in a device context 116 may anticipate that the document service 110 is readily available at all times, while a mobile application 104 interacting with the document service 110 over the internet 124 may anticipate sporadic unavailability of the document service 110, and may compensate for such unavailability with techniques such as an offline document cache and the representation of a set of mirrors of the document service 110.

The variance in the details of such contexts may introduce significant complexity for the application 104. In many such scenarios, the device 102 may provide little assistance for adapting the application 104 to the respective contexts of the document service 110. For example, the device 102 may provide various communications resources, such as an inter-process communication model and a network communication model, but may otherwise relegate any adaptation to varying circumstances to the application 104. Many such applications 104 may not provide such complex adaptability, and may only interact with document services 110 in some contexts (e.g., the device context 116) and may restrict interaction with document services 120 in other contexts. Alternatively, the application 104 may be agnostic of the context of interaction with the document service 110, and may simply provide adequate or inadequate performance depending on the context of the document service 110. Other applications 104 may provide varying degrees of adaptability to various contexts. However, in addition to involving the allocation of significant developer resources to enable and maintain such adaptability, developer-implemented adaptability may reveal significant variations in application behavior to the user of the application 104; e.g., a media-intensive application 104 may present high-quality media when accessed in the device context 116, such as high-resolution video and high-bitrate audio, and may present low-quality media suitable for streaming when accessing a document service 110 in a remote context 120. Moreover, if two or more applications 104 by different developers interact with document services 110 in different contexts, inconsistencies may arise between the applications 104 even if connecting to the same document services 110 (e.g., a first application 104 may provide sophisticated adaptability when connecting to the document service 110 in different contexts; a second application 104 may provide more basic adaptability with visible differences in application behavior; and a third application 104 may only interact with the document service 110 in a subset of the contexts). These and other distinctions, complications, and various sources of inefficiency and inconsistency may arise from the variance of the context of the interaction between the application 104 and the document service 110 in accordance with the techniques presented herein.

B. Presented Techniques

In view of these details, the techniques presented herein provide support for the interaction of an application 104 with a remote context 120 in a variety of contexts. The techniques presented herein involve the provision of a runtime set on the device 102, where respective runtimes mediate the interaction of the device 102 with a document service 110 in a particular context. The device 102 may be configured to select the appropriate runtime for a current context of the interaction with a particular document service 110, and may invoke the selected runtime to service the application 104 in the respective context. The selected runtime may adapt the interaction of the application 104 and the document service 110 to the current context. In this manner, the architecture of this solution may provide a sophisticated adaptability for various contexts, while alleviating the implementation of such features by the application 104, and also enabling the application 104 to specify the interaction with the document service 110 in a uniform manner despite the variable contexts of the interaction.

Figure 2:
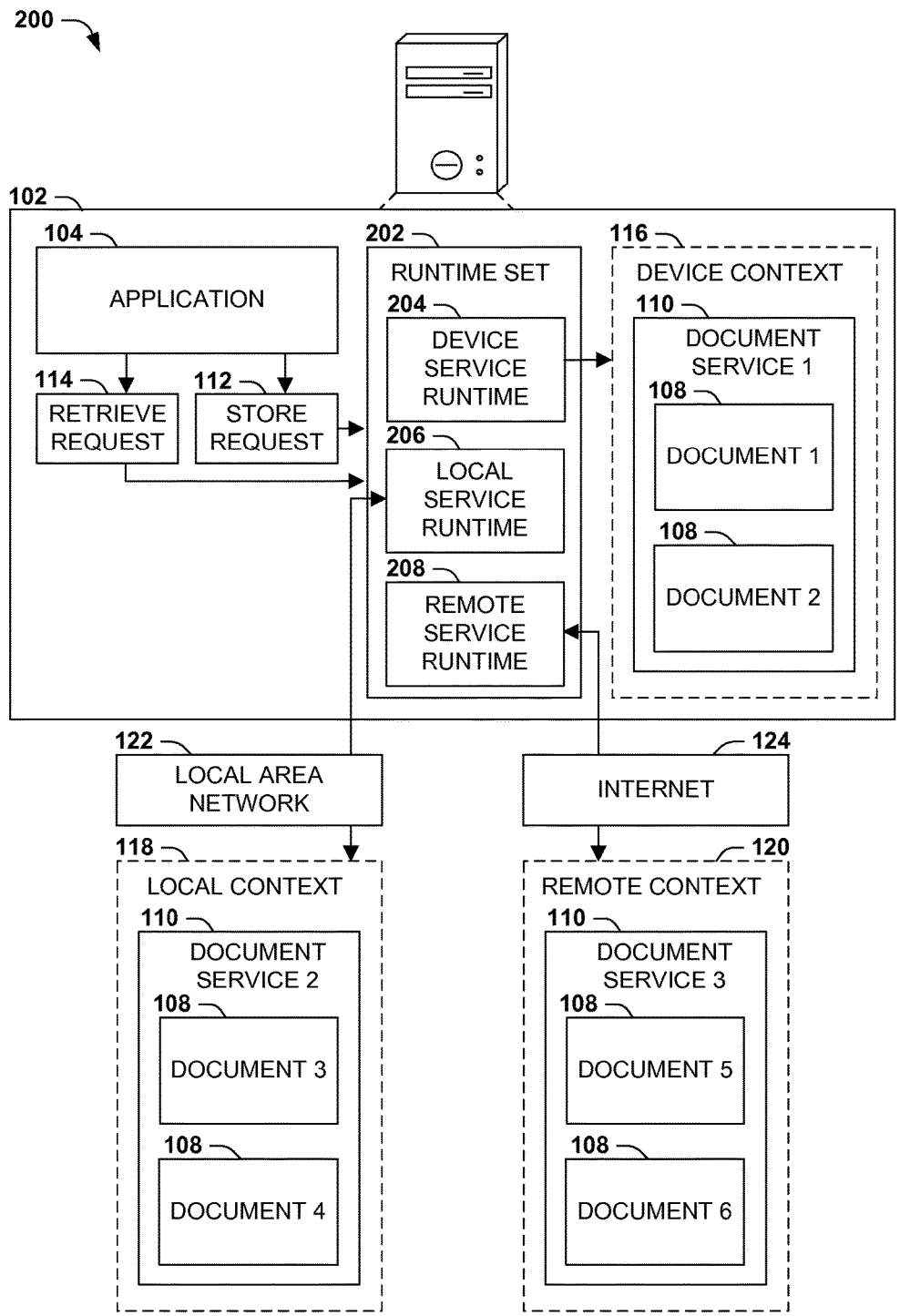
FIG. 2 is an illustration of an exemplary scenario featuring an exemplary set of interactions of an application with various document services in accordance with the techniques presented herein.

FIG. 2 presents an illustration of an exemplary scenario 200 of the techniques provided herein, wherein the device 102 executes an application 104 to interact with one or more document services 110. In accordance with the techniques presented herein, the device 102 may store a runtime set 202, involving a set of runtimes that are respectively adapted to provide access between an application 104 and a document service 110 in a particular context. The runtime set 202 includes a device service runtime 204 configured to interact with document services 110 in a device context 116 on the same device 102; a local service runtime 206 configured to interact with document services 110 accessible to the device 104 over a local area network 112; and a remote service runtime 208 configured to interact with document services 110 accessible to the device 102 over a wide area network, such as the Internet 124. For a particular document service 110, the application 104 may interact with the document service 110 through a runtime of the runtime set 202 that is suitable for the context of the document service 110. Moreover, the device 102 may be configured to, upon receiving a request from the 104 application to access a selected document service 110, automatically identify the context of the selected document service 110, and invoke a selected runtime of the runtime set 202 that is associated with the context of the selected document service 110.

The automated detection of the context of the document service 110, and the automated selection and invocation of a runtime of the runtime set 202 for the application 104 that is suitable for the context, may enable various advantages with respect to other such techniques. As a first exemplary advantage, this solution may automatically adapt the application 104 to the specific details of the context of the document service 110. Moreover, in some variations, these techniques may enable flexibility in such adaptation if the context of interaction with a document service 110 changes (e.g., if the application 104 executing on a mobile device 102 transitions from interacting with the document service 110 from a local context 118 to a remote context 120). As a second example, these techniques may alleviate the application 104 from providing context-specific adaptations and resources, such as different communications functions, availability detection, and connectivity models. Indeed, the application 104 may not be informed of the context of the interaction with the document service 110, but may simply provide a series of requests to interact with the document service 110 (such as a store request 112 and a retrieve request 114), which the selected runtime of the runtime set 202 may handle in a suitable manner based on the context of the document service 110. These techniques may therefore provide the application 104 with a consistent, simplified programming model or platform, through which the application 104 may seamlessly connect with a wide variety of documents services 110 in a wide variety of contexts. As a third example, these techniques may facilitate the consistency of the interactions of various applications 104 with the same or different document services 110, and/or economies of scale in mediating the interactions on behalf of several applications 104 executing on the device 104. For example, if two completely different applications 104 concurrently interact with the same document service 110 in a remote context 120, the remote service runtime 208 may provide a document cache that enable seamless interaction with the document 119 for both applications 104 even when communication with the document service 110 is interrupted. These and other advantages may be achievable through the provision of the runtime set 202 and the configuration of the device 102 in accordance with the techniques presented herein.

C. Exemplary Embodiments

Figure 3:
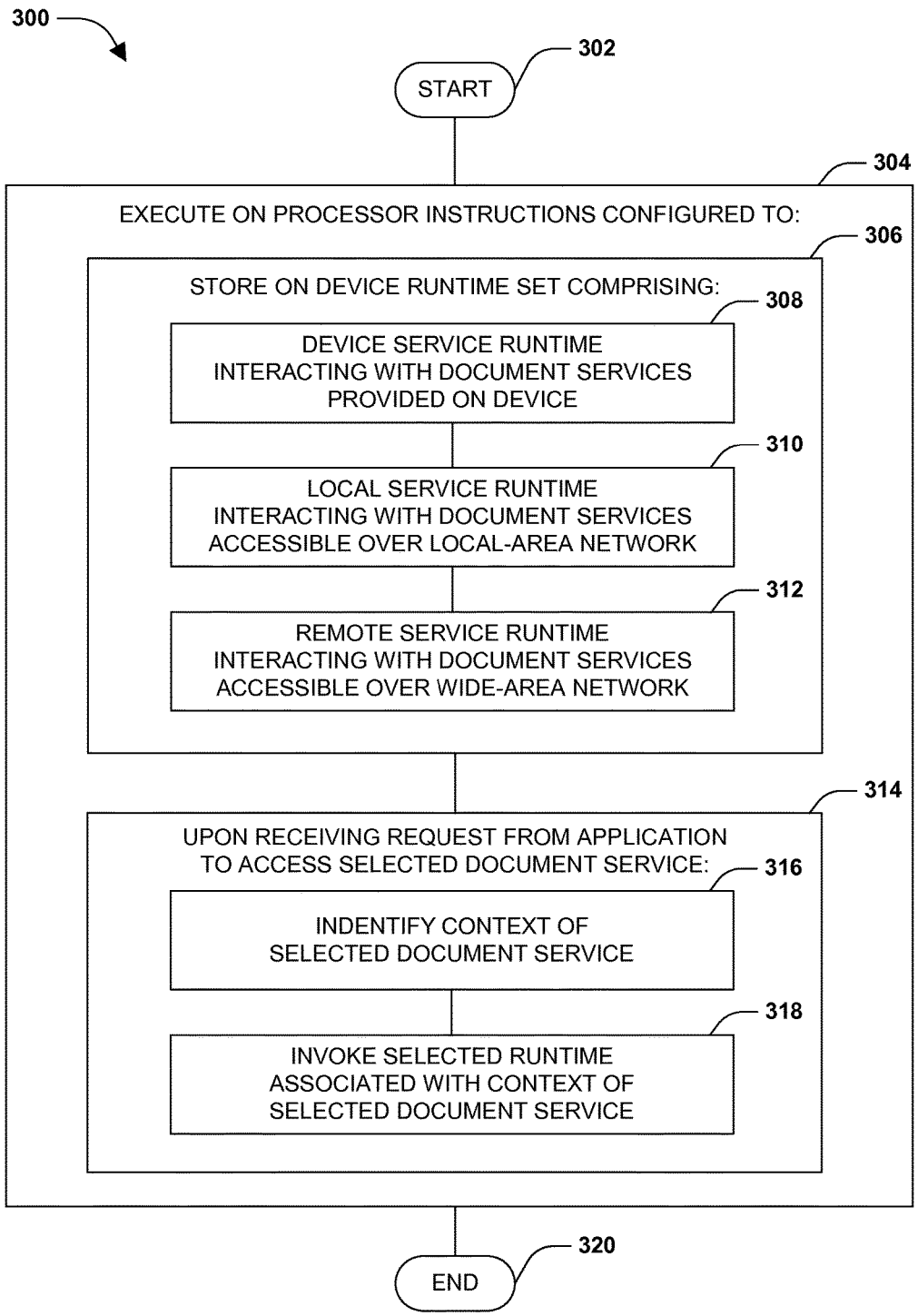
FIG. 3 is an illustration of an exemplary method of interfacing applications with document services in accordance with the techniques presented herein.

FIG. 3 presents a first exemplary embodiment of the techniques presented herein, illustrated as an exemplary method 300 of mediating the interactions of applications 104 executing on the device 402 with document services 110 according to a context 412 of the selected document service 110. The exemplary method 300 may be performed by a device 102, and may be implemented, e.g., as a set of instructions stored in a memory component of the device 102, such as a memory circuit, a platter of a hard disk drive, a solid-state storage device, or a magnetic or optical disc, and organized such that, when executed the device, cause the device 102 to operate according to the techniques presented herein. The exemplary method 300 begins at 302 and involves executing 304 the instructions on a processor of the device. Specifically, these instructions may be configured to store 306 on the device 102 a runtime set 202 comprising a device service runtime 308 interacting with document services 110 provided on the device 102 (i.e., in a device context 116); a local service runtime 310 interacting with document services 110 accessible to the device 102 over a local area network 122 (i.e., in a local context 118); and a remote service runtime 312 interacting with document services 110 accessible to the device 102 over a wide area network, such as the Internet 124 (i.e., in a remote context 120). The instructions are also configured to, upon receiving 314 a request from an application 104 to access a selected document service 110, identify 316 a context of the selected document service 110, and invoke 318 a selected runtime of the runtime set 202 associated with the context of the selected document service 110. Having achieved the interaction with the document service 110 on behalf of the application 104 through the detection of the current context of the document service 110 and the selection and invocation of a suitable runtime of the runtime set 202, the exemplary method 300 achieves the techniques presented herein, and so ends at 314.

Figure 4:
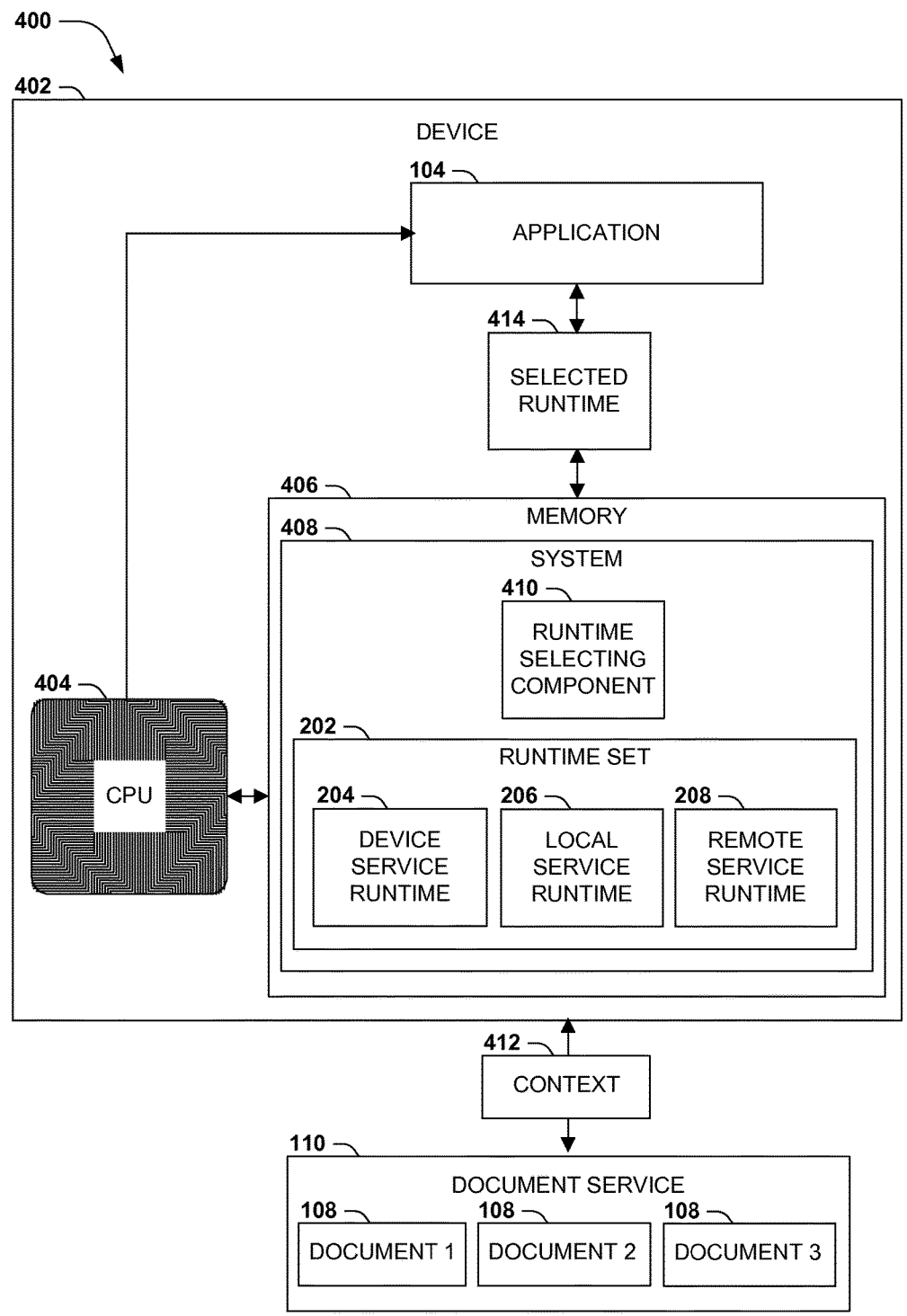
FIG. 4 is a component block diagram illustrating an exemplary system for interfacing applications with document services in accordance with the techniques presented herein.

FIG. 4 presents a second exemplary embodiment of the techniques presented herein, illustrated as an exemplary scenario 400 featuring an exemplary system 408 configured to mediate the interactions of applications 104 executing on the device 402 with document services 110 according to a context 412 of the selected document service 110. The exemplary system 408 may be implemented, e.g., as instructions stored in a memory 406 of a device 402 having a processor 404 and access to a document service 110, where the instructions comprising the components of the exemplary system 408 are configured to, when executed on the processor 404, cause the device 402 to operate according to the techniques presented herein. The exemplary system 408 comprises a runtime set 202 comprising runtimes respectively comprising instructions stored in the memory 406 of the device 402. In particular, the runtime set 202 comprises a device service runtime 204 configured to interact with document services 110 provided on the device 402 (i.e., in a device context 116); a local service runtime 206 configured to interact with document services 110 accessible to the device 102 over a local area network 122 (i.e., in a local context 118); and a remote service runtime 208 configured to interact with document services 110 accessible to the device 102 over a wide area network such as the Internet 124 (i.e., in a remote context 120). The exemplary system 408 also comprises a runtime selecting component 410, configured to, upon receiving a request from an application 104 to access a selected document service 110, identify 316 the context 412 of the selected document service 110, and invoke 318 a selected runtime 414 of the runtime set 202 that is associated with the context 412 of the selected document service 110. By mediating the interaction of the application 104 with the document service 110 adapted for the context 214 of the document service 110 in this manner, the exemplary system 408 achieves within the device 402 the application of the techniques presented herein.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
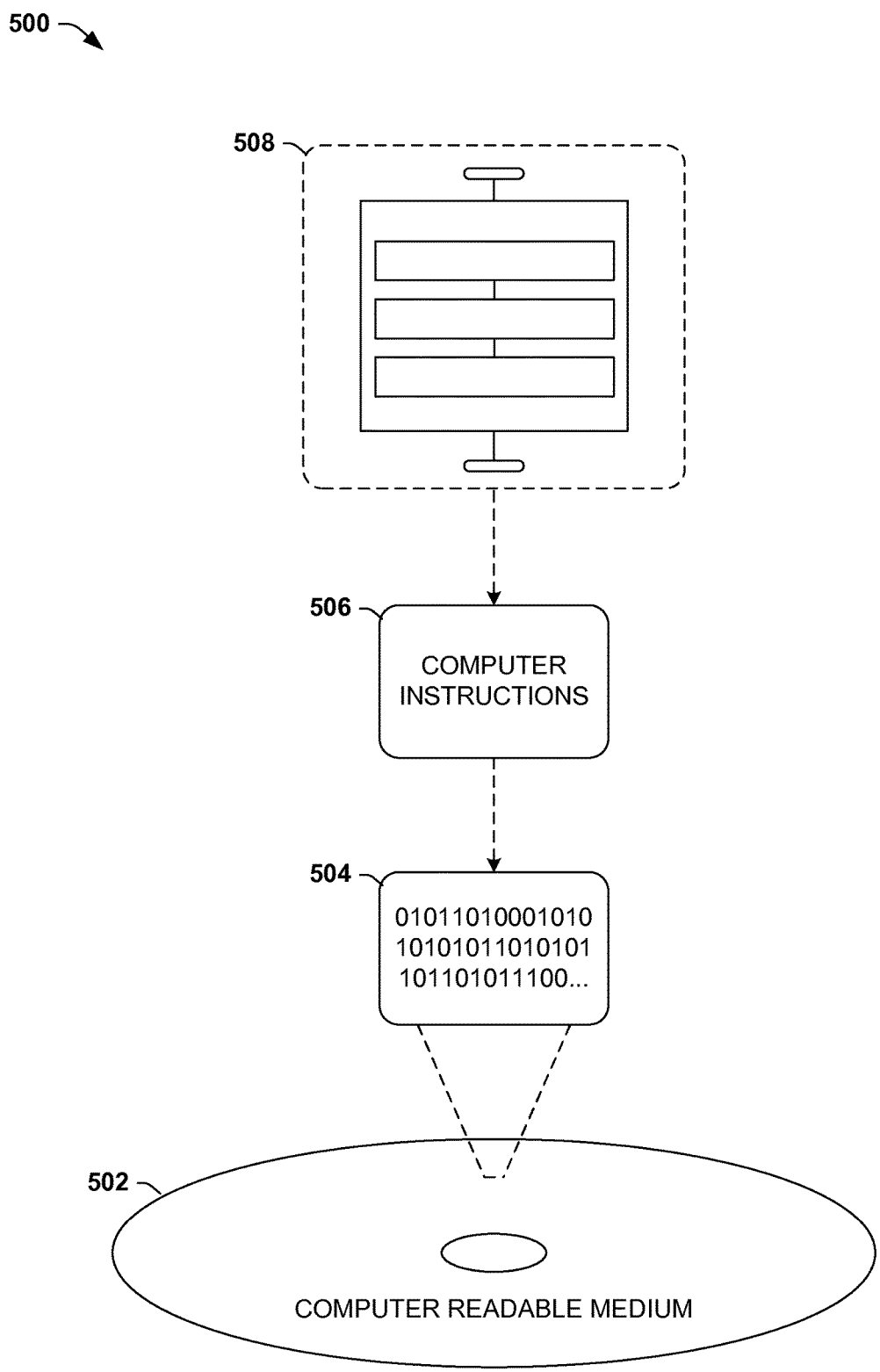
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to the principles set forth herein. In one such embodiment, the processor-executable instructions 506 may be configured to perform a method 508 of interacting with a document service 110 in a current context 412 on behalf of an application 104, such as the exemplary method 300 of FIG. 3. In another such embodiment, the processor-executable instructions 506 may be configured to implement a system configured to interact with a document service 110 in a current context 412 on behalf of an application 104, such as the exemplary system 408 of FIG. 4. Some embodiments of this computer-readable medium may comprise a computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3 and the exemplary system 408 of FIG. 4) to confer individual and/or synergistic advantages upon such embodiments.

D1. Scenarios

A first aspect that may vary among embodiments of these techniques relates to the scenarios wherein such techniques may be utilized.

As a first variation of this first aspect, the techniques presented herein may be utilized with many types of device 102, such as servers, server farms, workstations, laptops, tablets, mobile phones, game consoles, and network appliances. Such devices 102 may also provide a variety of computing components, such as wired or wireless communications devices; human input devices, such as keyboards, mice, touchpads, touch-sensitive displays, microphones, and gesture-based input components; automated input devices, such as still or motion cameras, global positioning service (GPS) devices, and other sensors; output devices such as displays and speakers; and communication devices, such as wired and/or wireless network components.

As a second variation of this first aspect, the techniques presented herein may be utilized to service various types of applications 104, such as server applications, client applications, peer-to-peer applications, web applications, office productivity applications, information access applications, data analysis applications, utilities, games, operating system components, application programming interfaces (APIs), and hardware or software drivers. Additionally, such applications 104 may be provided in a variety of application languages, including low-level languages such as assembly encoded or machine instructions provided for a particular device 102; imperative, declarative, object-oriented, and/or aspect-oriented languages; and compiled and/or interpreted languages, such as scripting languages. Moreover, such application languages may target a particular device 102 or architecture, such as a native application encoded according to the machine language of a particular device 102, architecture, or platform; may be specified according to a model environment, but compiled and/or interpreted according to the capabilities of a particular device 102, architecture, or platform; or may execute within a virtual environment, such as a web browser or a virtual machine. As one example, the application language of the application 104 may comprise the JavaScript language.

As a third variation of this first aspect, the application 104 may interact with many types of document services 110 storing many types of documents 108. As a first such example, the documents 108 may represent objects in an object-oriented environment that respectively comprise a set of member fields; tuples comprising sets of related values; and records of a table in a database. Such documents 108 may present various types and degrees of structure, including completely unstructured data sets; low-level structures, such as key/value stores; and highly defined structures according to a class definition or a schema. As one example, the documents 108 may be formatted according to the JavaScript Object Notation (JSON) application format. As a second such example, the document service 110 may be structured in various ways, such as a file store comprising a set of human-readable or human-unreadable files, or a database server comprising a set of database tables representing the documents 108 and a set of database records. As one example, the document service 110 may comprise a JSON document store, configured to store, access, and index documents 108 structured in the JSON application format.

As a fourth variation of this first aspect, the relationship of the runtimes 414 and the application 104 within the device 102 may be achieved in various configurations. As a first such example, the runtime 414 may comprising a manager or virtual machine of the application 104, which may manager may apply and even alter the logic of the application 104 (such as evaluating a script) in accordance with the context 412 of the interaction. As a second such example, the runtime 414 may comprise an application interface for the document service 110, such as a proxy through which the application 104 may provide a set of request. The device 102 may, upon invoking a selected runtime 414 to interact with a document service 110 in a particular context 412, provide the application interface of the runtime 414 to the application 104. These and other variations may be suitable for implementations of the techniques presented herein.

D2. Context Variations

A second aspect that may vary among embodiments of these techniques involves the variations between the contexts 412, and the runtimes 414 providing access to a selected document service 110 in a particular context 412.

As a first variation of this second aspect, the application 104 and document service 110 may communicate through many types of communications channels. For example, when installed on the same device 102 as the application 104, the document service 110 may communicate with the application 104 through an interprocess communication channel, such as by sending messages through the event messaging channel of an operating system of the device 102 or by posting messages to a shared memory buffer within the device 102, or by sharing a hardware bus, such as a universal serial bus (USB) channel. Alternatively, when the document service 110 is not installed on the same device 102 as the application 104, the document service 110 and application 104 may communicate through a network communication channel, such as a transmission control protocol (TCP) or user datagram protocol (UDP) communication session. These details may be handled by the different runtimes 414 of the runtime set 202; e.g., the device service runtime 204 may utilize an interprocess communication channel for communicating with document services 110 on behalf of applications 104, while the local service runtime 206 and remote service runtime 208 may utilize a network communication channel for communicating with document services 110 on behalf of applications 104.

As a second variation of this second aspect, the runtimes 414 may access the documents 108 of the document service 110 in various ways. For example, a document service 110 accessible in a device context may represent the documents 108 as files in a file system of the device 102, such as identifying respective documents 108 by a filename, and providing file handles in response to requests to access the documents 108. Accordingly, the device service runtime 204 may access the documents on behalf of the application 104 by requesting access through the file system. However, a document service 110 may provide access through a file sharing protocol that is suitable for a local area network 122, such as server message block (SAMBA) file sharing, and may identify the documents according to a SAMBA URL. Accordingly, the local service runtime 206 may access the documents 108 of the document service 110 through the local area network file sharing protocol. Additionally, a remotely deployed document service 110 may provide access to the documents 108 through a network address model, such as specifying one or more HTTP server addresses as the address of the 108, and the remote service runtime 208 may access the documents 108 in this manner.

As a third variation of this second aspect, the document service 110 may provide various transactional models for enabling the application of a set of operations to the documents 108 of the document set in a controlled manner. For example, the application 104 may request the commission of a batch of operations to the document set in an atomic manner, such that either all operations are successfully applied or none of the operations succeed. The application of transactions by the document service 110 may be achieved through various techniques, and different runtimes 414 may interoperate with document services 110 in a different manner to achieve the fulfillment of a requested transaction, based on the context 412 of the interaction. For example, the device service runtime 204 may interact with a local deployment of the document service 108 through a lightweight transactional model, in anticipation of a comparatively low degree of concurrent requests to access the same document 108. To this end, the device service runtime 204 may utilize a BASE (basic availability, soft state, and eventual consistency) transaction model that provides lightweight transactional access; e.g., the device service runtime 204 may interact with the document service 110 through a file system transaction model, where files comprising the documents 108 involved in the transaction are locked through the file system for exclusive access by the application 104 so that the transaction may be applied to all of the documents 108 together. Alternatively, the local service runtime 206 and the remote service runtime 208 may access the documents 108 of a selected document service 110 through an acid (atomic, consistent, isolated, and durable) transaction model, e.g., by invoking a transaction interface through the document service 110 that provides guarantees of rapid availability of data updates and logical consistency of the provided data.

As a fourth variation of this second aspect, access to the document service 110 may involve a document cache. For example, when accessed in a remote context 120 (such as on a mobile device 102 and/or over the Internet 124), the document service 110 may involve a comparatively low-bandwidth or high-latency connection, and may occasionally be unavailable. In order to facilitate consistent access, the remote service runtime 208 may provide a document cache storing some or all of the documents 108 of the document service 110. Additionally, the remote service runtime 208 may fulfill requests by the application 104 involving updates to the document set (e.g., the creation of new documents 108, or the updating or deletion of one or more documents 108) by applying such updates first to the document cache, and then synchronizing the document cache with the document service 110 (either promptly, during a period of plentiful bandwidth availability, or upon reconnection). Moreover, the cache remote service runtime 208 may provide such access through a resource-conserving cache, such as a cache of a small number of recently accessed documents and an on-demand synchronization model that together conserve the storage and network resources of the device 102. Conversely, a local service runtime 206 may utilize a performance-facilitating document cache to facilitate rapid access to current versions of the documents 108. For example, a rapid and continuous synchronization model may be utilized, such as a subscription model, where updates to a document 108 by a locally accessible document service 110 are promptly and automatically sent to the device 102, thereby maintaining a high degree off freshness of the cached documents. This type of document cache may be provided not to ameliorate limited storage and sporadic network accessibility, but to utilize plentiful computational and networking resources to enhance the performance of the application 104. The device service runtime 204, accessing the document service 110 in a device context 116, may omit a document cache altogether, and may directly retrieve the documents from the document service 110.

As a fifth variation of this second aspect, the trust and security mechanisms utilized by each runtime 414 may be adapted to the corresponding properties of the context 412. While a variety of security measures may be applied to provide and verify the security of interactions in various contexts 412, the application of higher-grade security measures often involves an expenditure of computing resources (e.g., higher levels of encryption, such as successively higher bit rates of the advanced encryption standard (AES) encryption protocol), thereby reducing the performance of the application 104. As a result, it may be desirable to configure respective runtimes 414 to apply security measures proportional with the trust level of the context 412.

As a first example of this fifth variation of this second aspect, in a device context 116, a high degree of trust may be ascribed to the applications 104 and document services 110 invoked on behalf of a trusted user. Accordingly, a comparatively simple trust model may be utilized by the device service runtime 204, such as a first encryption mechanism that applies only lightweight encryption to the communication between the application 104 and the document service 110, or that utilizes clear communication without encryption. In a local context 118 involving communication over a local area network 122, the trust level may be modest, and the local service runtime 26 may communicate with the selected document service 110 using a second encryption mechanism that is stronger than the first encryption mechanism, such as 196-bit AES encryption with frequently rotated keys. In a remote context 120, the trust level may be very low, and the remote service runtime 208 may communicate with the selected document service 110 using a third encryption mechanism that is stronger than the second encryption mechanism, such as 256-bit AES encryption utilizing one-time keys.

As a second example of this fifth variation of this second aspect, variable degrees of authentication may be utilized. For example, in a device context 116, the runtime 414 may presume that man-in-the-middle attacks are uncommon, and the document service 110 may presume that applications 108 purportedly executing on behalf of a user identified by the device 102 have been fully authenticated by the device 102. Accordingly, a device service runtime 204 may be configured not to perform an authentication of the application 104 or the user with the document service 110, but may simply initiate a communication session and provide a series of requests on behalf of the application 104 and the user. However, in other contexts 412, the trust level may be reduced, and varying degrees of authentication may be desirable. For example, a locally accessible document service 110 may verify that the requests of the application 104 to access the documents 108 are authorized by an authenticated user according to a login and password combination, while a remotely accessible document service 110 utilizes a two-factor authentication technique that provides a more rigorous authentication mechanism for verifying the identity of the user. Conversely, an application 104 may not attempt to authenticate a document service 110 invoked in a device context 116 or a local context 118, but may authenticate the identity of document services 110 accessed in a remote context 120, e.g., by examining an identity certificate provided by the document service 110 during session initiation.

Figure 6:
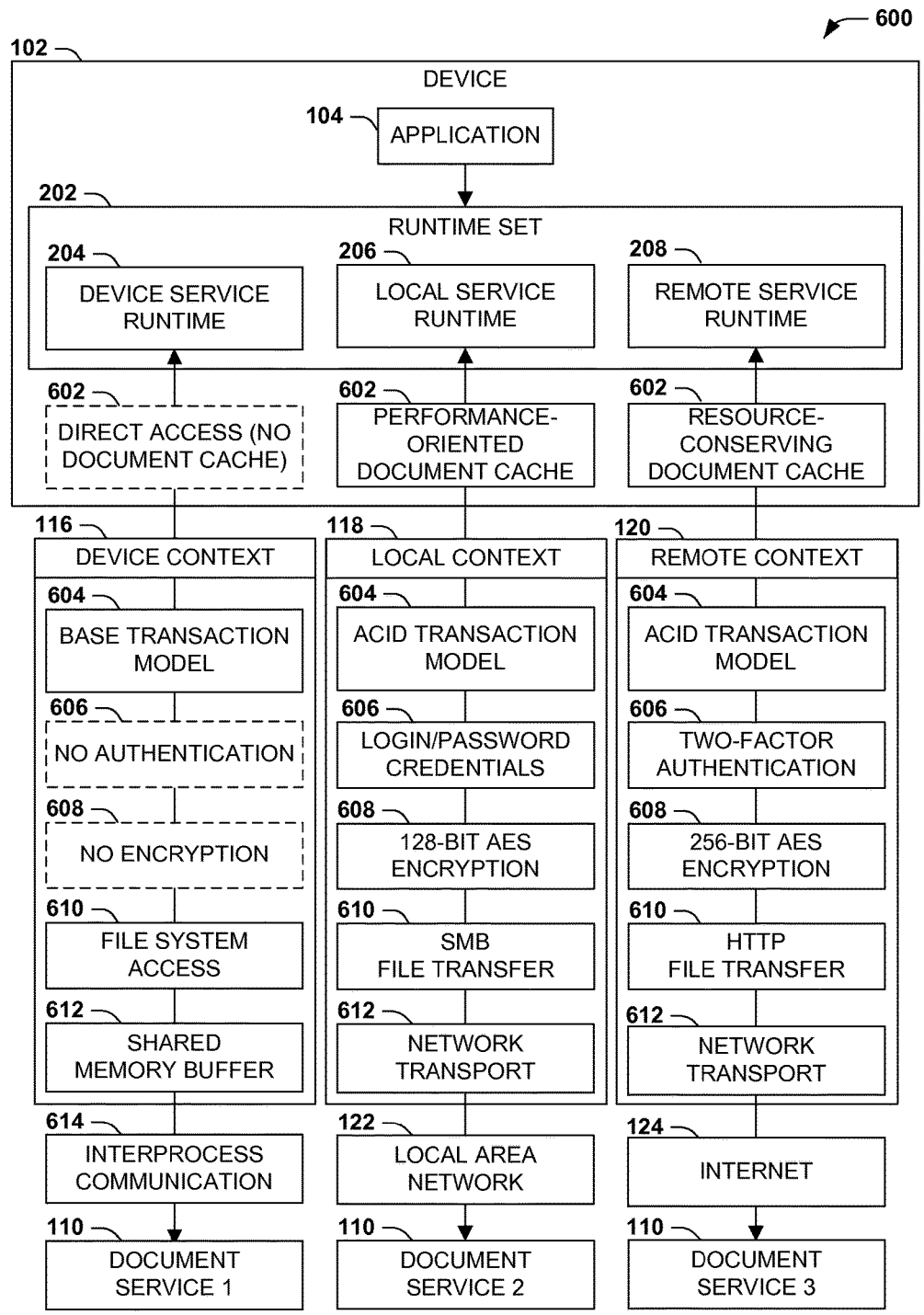
FIG. 6 is an illustration of an exemplary scenario featuring an exemplary set of runtimes providing access to document services in a variety of contexts and with a variety of features.

FIG. 6 presents an illustration of an exemplary scenario 600 depicting a significant variation in the configuration of the runtimes 414 in order to interact with document services 110 in a variety of contexts 412. In this exemplary scenario 600, a device 102 executing an application 104 may request to interact with a document service 110, and the interaction may be mediated by a selected runtime 414 in accordance with the context 412 of the interaction. As a first example, the cache mechanism 602 of the runtimes 414 may vary; e.g., a device service runtime 204 may directly access the documents 108 as files of a file system of the device 102; the local service runtime 206 utilizes a performance-oriented document cache that aggressively synchronizes updates with a locally deployed document service 110; and the remote service runtime 208 utilizes a resource-conserving document cache that provides interaction with a document set while the document service 110 is sporadically inaccessible. As a second example, the runtimes 414 may utilize different transaction models 604; e.g., the device service runtime 204 may request comparatively relaxed transactions among documents 108 shared by the document service 110 only with a few other applications 104, while the local service runtime 206 and remote service runtime 208 perform acid transactions with high dependability. As a third example, the runtimes 414 may utilize different authentication mechanisms 606 and encryption mechanisms 608; e.g., the device service runtime 204 may utilize no authentication or encryption while interacting with the document service 110, while the local service runtime 206 utilizes a login/password user authentication mechanism and a comparatively casual encryption standard, while the remote service runtime 208 utilizes a two-factor authentication mechanism and a comparatively rigorous encryption standard. As a third example, the runtimes 414 may access documents 108 through various access models 610; e.g., the device service runtime 204 may access the documents 108 as files using the file system of the device 102, while the local service runtime 206 utilizes an SMB access mechanism, and the remote service runtime 208 utilizes an HTTP transfer access mechanism. As a fourth example, the runtimes 414 may interact with the document service 110 through different communication models 612; e.g., the device service runtime 204 may exchange requests and information with the document service 110 through a shared memory buffer 612 and an interprocess communication mechanism 614, while the local service runtime 206 utilizes network transport 612 over a local area network 112, and the remote service runtime 208 utilizes network transport 612 over the Internet 124. In this manner, each runtime 414 may mediate the interaction between the application 104 and the document service 110 according to the context 412 of the document service 110. These and other variations among the contexts 412 of interaction with respective document services 110, and the configuration of the runtimes 414 of the runtime set 202 according to such contexts 412, may be included in implementations of the techniques presented herein.

D3. Context Selection

A third aspect that may vary among embodiments of the techniques provided herein involves the selection of the context 412.

As a first variation of this third aspect, the device 102 may be configured to detect the context 412 and select the corresponding runtime 414 automatically. Alternatively or additionally, the device 102 may receive a selection of the context 412 from a user of the device 102, and may interact with the document service 110 according to the selected context 412. In some scenarios, the user may select a context 412 other than the context 412 that the device 102 may have automatically selected; e.g., the context 412 may be provided on the same device 102 as the application 104, but the user may select a local context 118 in order to achieve a network communication channel between the application 104 and the document service 110 instead of an interprocess communication channel. A combination of these techniques may also be utilized; e.g., the device 102 may select a particular context 412 and corresponding runtime 414 if the user does not specify a context 412, or may select a first context 412 and corresponding runtime 414 over a user-specified second context 412 and corresponding runtime 414 if the latter options are inapplicable, incompatible with the document service 110, or less efficient than the first context 412.

As a second variation of this third aspect, the selection of the context 412 and corresponding runtime 414 may be informed by many details of the computing environment of the device 102 and the interaction between the application 104 and the document service 110. As a first example, the device 102 may be configured to compare a network address of the document service 110 and a network address of the device 102 upon receiving a request to instantiate the application 104. As a second such example, respective contexts 412 may be associated with a feature set, such as the application of a particular type and level of encryption and/or authentication, a document service connectivity model (e.g., a first feature set comprising an interprocess communication channel, direct access of the documents 108 of the document service 110, a lock-based transactional model, and a basic query processor, and a second feature set comprising a network communication channel, utilizing a document cache, an ACID transaction model, and a robust query processor). The device 102 may therefore compare a set of features requested or specified by the application 104, the document service 110, or a user of the application 104, and select a runtime 414 enabling the interaction between the application 104 and the document service 110 incorporating the specified features. As a third such example, respective contexts 412 may be determined by monitoring a document service characteristic set, such as the replication of the document set across one or more replica servers; the bandwidth or latency between the application 104 and the document service 110; the reliability and consistency of the communication channel between the application 104 and the document service 110; the achievable throughput of the processing model, such as the availability of parallelizable queries and/or agent execution; and the degree and incidence of concurrent access to the documents 108 by various users and applications 108. Such document service characteristics may also include details of the document set, including the number and variety of the documents 108; the sizes and access patterns of the documents (e.g., atomic, sequential streaming, or random access); the volatility of the document set; the type and security of the data contained in the documents 108; and the interrelatedness of the documents 108.

These and other details may contribute to the automated selection of a context 412 and selection of a runtime 414 for the document service 110. For example, respective runtimes 414 of the runtime set 202 may specify a document service characteristic set, such as the document service 110 specifying the achievable performance and/or supported capabilities while interacting with the application 104. Alternatively, the device 102 may measure the document service characteristics, such as an initial bandwidth or feature test performed while initiating communication with the selected document service 110. The device 102 may identify the context 412 of the selected document service 110 by determining at least one document service characteristic of the selected document service 110, comparing the document service characteristics of the selected document service 110 with the document service characteristic sets of the respective 414 runtimes of the runtime set 202, and identifying the selected runtime 414 having a document service characteristic set that closely matches the document service characteristics of the selected document service 110.

As a third variation of this third aspect, because details of the interaction may change over time, the device 102 may be configured to monitor the features and performance characteristics of the interaction, and to adapt to changes in the interaction thereof. As a first example, the device 102 may track the features utilized by the interaction of the application 104 and the document service 110, and, upon detecting a change in the utilized features (e.g., new application behavior that involves a first use of a feature of the document service 110 that has not previously been utilized, or the cessation of the use of a feature), the device 102 may transition from the initial context 412 of the document service 110 to a second context 412. As a second example, respective runtimes 414 may be configured to generate a runtime session while servicing an application 104, and upon detecting a transition from a first context 412 during a current runtime session generated by a first selected runtime 414 to a second context 412 that is different from the first context, the device 102 may select a second selected runtime 414 that is associated with the second context 412, and invoke the second selected runtime 414 with the current runtime session generated by the first selected runtime 414. In this manner, the device 104 may maintain the application state of the application 104 even while switching contexts 412.

Figure 7:
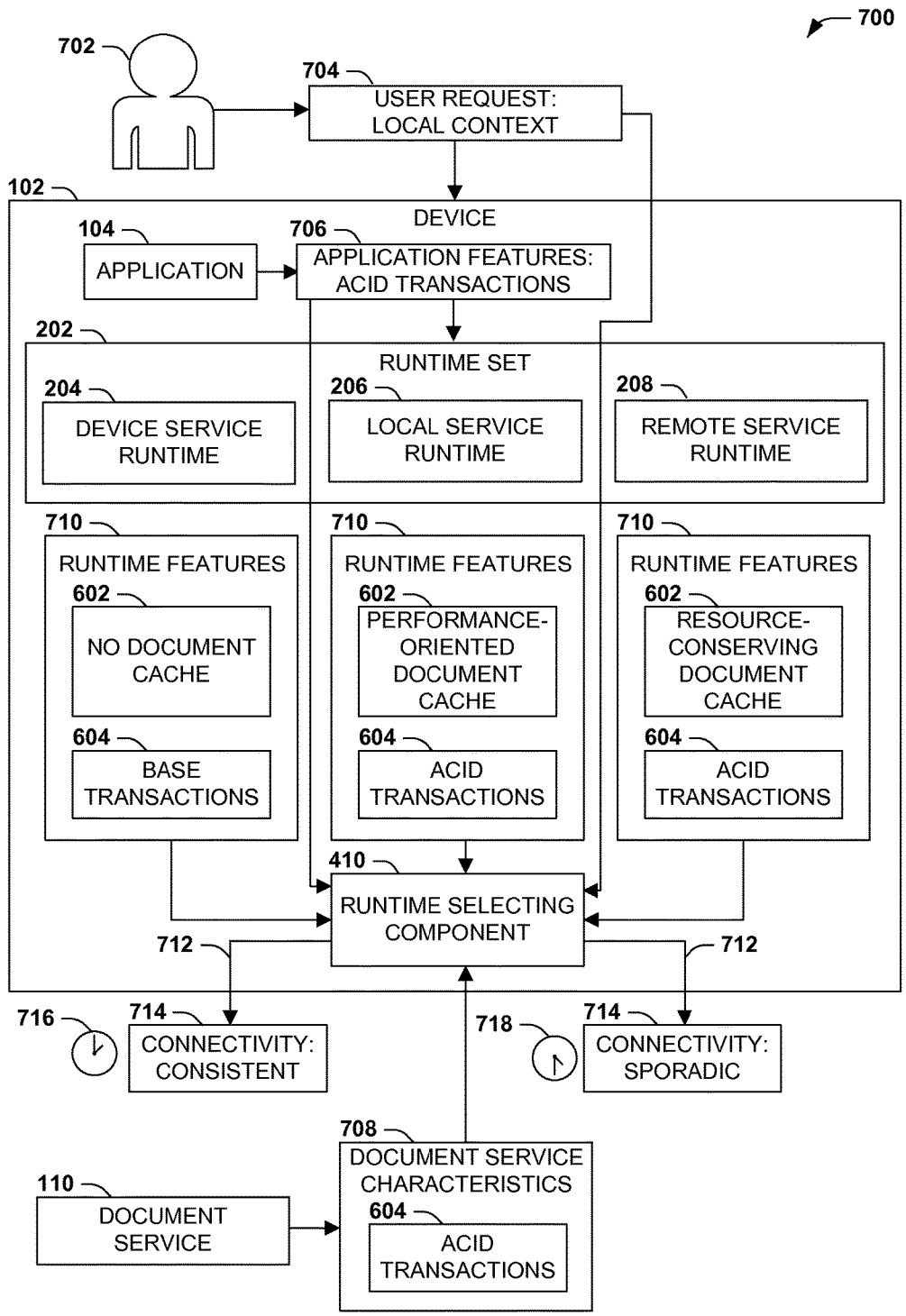
FIG. 7 is an illustration of an exemplary scenario featuring a runtime selecting component configured to select a runtime from a runtime set for interacting with a document service in a context according to various features and service characteristics.

FIG. 7 presents an illustration of an exemplary scenario 700 featuring a runtime selecting component 410 configured to identify a context 412 of an interaction between an application 104 executed on behalf of a user 702 and a document service 110 according to a variety of service characteristics. As a first example, respective runtimes 414 provide a set of runtime features 710 that are supported by the runtime 414 for interactions with the document service 110, such as different types of document caches 602 and different transaction models 604. As a second example, the user 702 of the application 104 may provide a user request 704 to initiate the application 104 in a particular context 412, such as a local context 118. As a third example, the application 104 may specify a set of application features 706 that are utilized by the application 104. As a fourth example, the document service 10 may specify a document service characteristic set, comprising at least one document service characteristic 708 that is supported by or achievable in interactions with the document service 110 (e.g., the transaction model supported by the document service 110). In view of these various sources of information available at a first time 716, the runtime selecting component 410 may select a context 412 of the interaction with the document service 110 and a runtime 414 suitable for that context 412, such as a local context 118 enabled by a local service runtime 206, by comparing the document service characteristics 708 and the application features 706 with the runtime features 710 of the respective runtimes, and identifying a runtime 414 closely matching these properties. Notably, the document service characteristics 708, application features 706, and runtime features 710 may identify two or more satisfactory runtimes 414, and the user request 704 may enable a selection thereamong. Conversely, the context 412 selected by the runtime selecting component 410 may differ from the user request 704 if a different runtime may provide higher performance or compatibility between the application 104 and the document service 110.

Moreover, the runtime selecting component 410 may measure 714 the document service characteristics 708 of the selected document service 110 over time, and may adapt the selection of the runtime 414 to the changing circumstances. For example, at the first time 716, the runtime selecting component 410 may monitor 712 various performance characteristics 714 of the document service 110, such as the connectivity and availability of the document service 10. While such performance characteristics 714 remain consistent, the local runtime service 206 may mediate the interactions of the application 104 and the document service 110. However, the monitoring 712 may result in the detection of a change in at least one performance characteristic 714 of the interaction, such as a change at a second time 718 from a consistent connection to a sporadic connection. If another runtime 414 is more suitable for the second context 412, such as the remote service runtime 208 that is particularly configured for sporadic connectivity, the runtime selecting component 410 may invoke the second runtime 414 for the second context 412, and may optionally transfer the current runtime session from the first runtime 414 to the second runtime 414, thereby providing a seamless transition and a maintenance of application state of the application 104. In this manner, the runtime selecting component 410 may apply a variety of criteria to achieve the identification of the context 412 of the interaction and the selection of a runtime 414 to mediate the interaction of the application 104 and the document service 110 in accordance with the techniques presented herein.

D4. Resource Model

A fourth aspect that may vary among embodiments of these techniques involves the presentation of the document service 110 to the application 104 as a set of resources. In some scenarios, such as the exemplary scenario 600 of FIG. 6, the application 104 may not comprise context-specific resources or configurations, but may simply interact with the document service 110 as a series of requests, irrespective of the resolution of all of these details by the runtime 414 selected for the current context 412 of the document service 110. Indeed, despite the considerable variations in these interactions, access to the document service 110 may appear comparatively equivalent to the application 104 and a user of the device 102, which may not even be informed of the context 412. However, in some scenarios, the application 104 may be informed of, and may explore in detail, the context 412 of the interaction with the document service 110. For example, runtime 414 may expose a set of document service characteristics describing the document service 110 as a resource set of resources comprising the document service 110, and may, upon receiving a request from the application 104 to describe the document service 110, present the resource set of resources comprising the document service 110 to the application 104. For example, the resource set of the document service 110 may comprise at least one user account through which the document service 110 is accessed; at least one access permission associated with a user account with the document service; for a document set provided by the document service, at least one document set comprising at least one document 108 of the document service 110 (e.g., a collection of related documents 108); at least one partition distributing the document service across one or more document server (e.g., a set of geographically distributed replicas of the document service 108); and at least one endpoint associated with at least one resource of the document service (e.g., a network address of a cluster of document servers that together provide a portion of the document service 110). Additionally, in some contexts 412, the application 104 and/or a runtime 414 may participate in the administrative tasks involving the document service 110; e.g., the device service runtime 204 interacting with the document service 110 in a device context 116 may initiate a synchronization, compaction, or archiving of the document service 110, while such administrative tasks may not be exposed to the remote service runtime 208. The document service 110 may also be configured to identify respective resources of the resource set by a resource uniform resource identifier, and the runtimes 414 may be configured to interact with the document service 110 by submitting requests to endpoints of the document service, where respective endpoints identified by the document service 110 by an access uniform resource identifier (URI) identifying the requested service, and identifying the resources involved in the request by a resource uniform resource identifier (URI).

Figure 8:
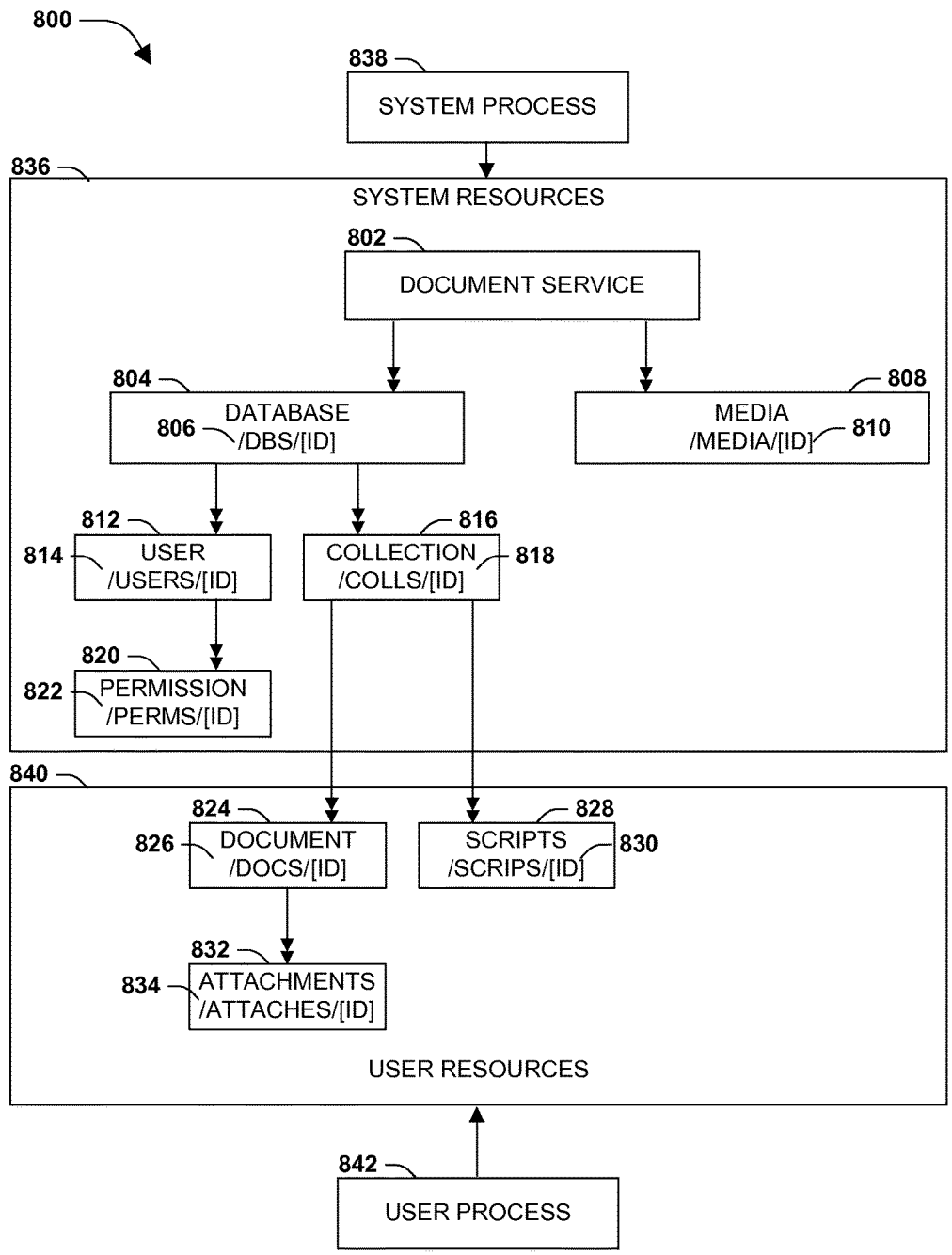
FIG. 8 is an illustration of an exemplary scenario featuring an exemplary resource model for presenting a document service to an application.

FIG. 8 is an illustration of an exemplary scenario 800 featuring an exemplary resource model for presenting a document service 110 to an application 104. In this exemplary scenario 800, the document service 110 is partitioned into a set of hierarchically arranged resources, which may be exposed to the application 104 as a description of the document service 110, and to assist the application 104 in interacting with the document service 110. Moreover, respective resources may be identified with hierarchically organized identifiers, such as uniform resource identifiers (URIs) identifying both the resource and the type of the resource. For example, the document service resource set may comprise a document service resource 802, which in turn comprises a set of database resources 804 (identified by a database identifier 806) and a set of media resources 808 (identified by a media identifier 810). Each database resource 804 may comprise a set of user resources 812 (identified by a user identifier 822), respectively associated with a set of permission resources 820 (identified by a permission identifier 822), and a set of collection resources 816 (identified by a collection identifier 818). The collection resources 816, in turn, may comprise a set of document resources 824 (identified by a document identifier 826), respectively associated with a set of attachment resources 832 (identified by an attachment identifier 834), and a set of script resources 828 (identified by a script identifier 830). Moreover, the resources of the document service resource set may be divided into a set of system resources 836, managed by a system process 838, and a set of user resources 840, managed by a user process 842 (and further regulated according to the permission resources 820 associated with the user resource 812). The exemplary document service resource set may be presented to an application 104, which may interact with the various components of the document service 110 by identifying the different resources (by specifying the identifier of each resource). In this manner, the document device 110 may be presented to the application 104 as a hierarchically organized set of resources, and may interact with the application 104 through a resource model (e.g., presenting a RESTful interface for invoking various services on various resources, where the services are identified by service URL, and the resources are identified by resource identifiers represented as a resource URL). Many such resource models of a document service 110 may be devised and presented to applications 104 in accordance with the techniques presented herein.

E. Computing Environment

Figure 9:
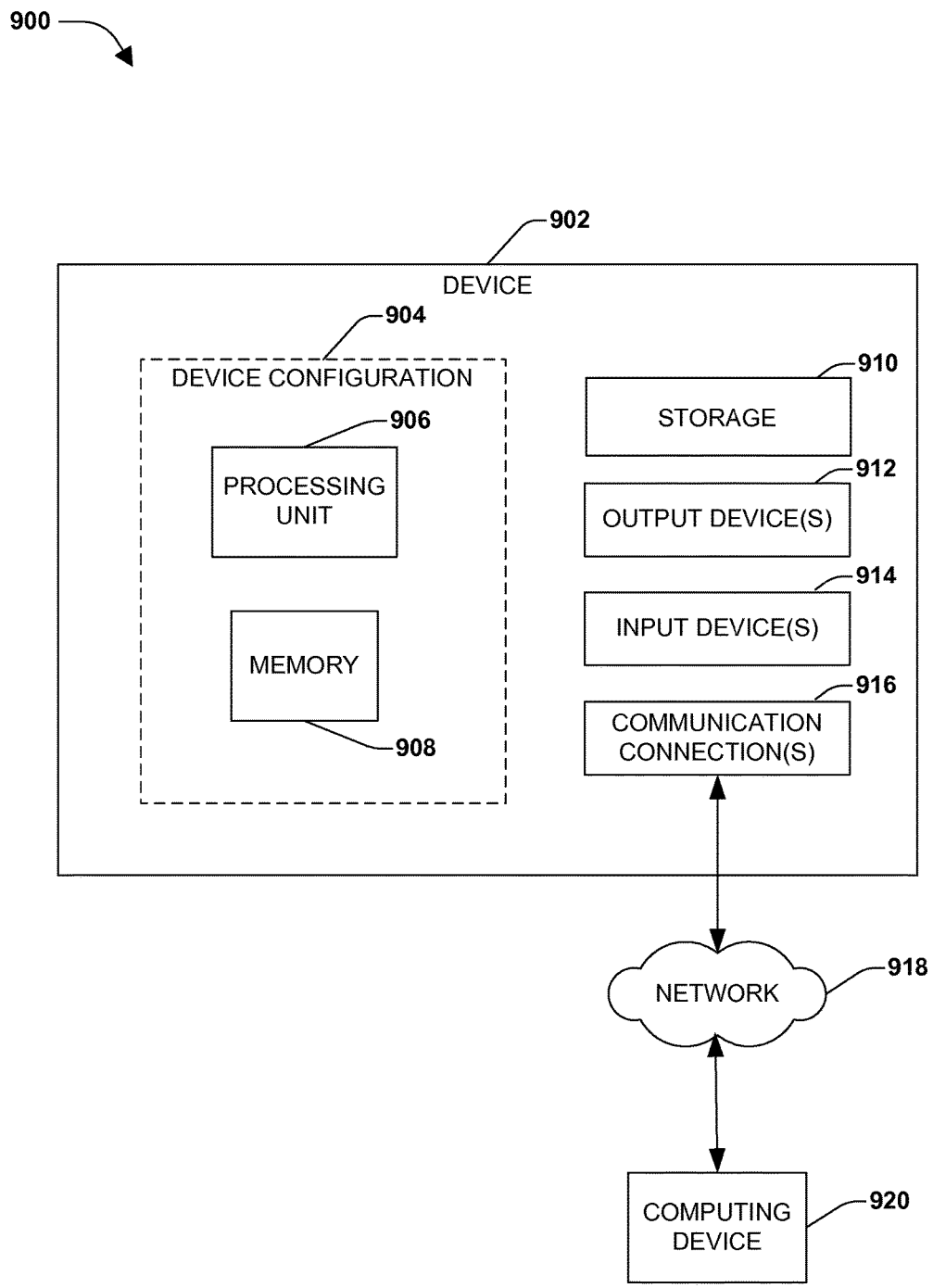
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of interfacing applications, on a device having a processor, with documents, the method comprising:
    executing by the processor instructions that cause the device to:
        store on the device a runtime set comprising runtimes that respectively access documents according to performance characteristics that are specific to a context including a location of each document relative to the device, wherein the runtimes comprise:
            a device storage runtime that accesses documents according to performance characteristics for documents that are stored on the device;
            a local storage runtime that accesses documents according to performance characteristics for documents that that are accessible to the device over a local-area network; and
            a remote storage runtime that accesses documents according to performance characteristics for documents that are accessible to the device over a wide-area network; and
        responsive to a request, received by the device, from at least one of the applications to access a document:
            identify, by the device, a context of the requested document including a location of the requested document relative to the device; and
            invoke, by the device, a selected runtime of the runtime set associated with the context including the location of the requested document relative to the device to access the requested document.

2. The method of claim 1, wherein:
    respective runtimes of the runtime set specify a document service characteristic set comprising at least one document service characteristic of document services with which the respective runtimes interact; and
    the identifying the context of the requested document further comprises:
        determining at least one document service characteristic of a selected document service;
        comparing at least one document service characteristic of the selected document service with the document service characteristic set of the respective runtimes; and
        identifying the selected runtime having a document service characteristic set closely matching the at least one document service characteristic of the selected document service.

3. The method of claim 2, wherein the determining the at least one document service characteristic of the selected document service further comprises:
    measuring the at least one document service characteristic of the selected document service.

4. The method of claim 2, the determining the at least one document service characteristic of the selected document service further comprises:
    receiving the at least one document service characteristic from the selected document service.

5. The method of claim 2, wherein:
    the at least one application specifying at least one target document service characteristic; and
    the identifying the selected runtime comprising:
        identifying the selected runtime having a document service characteristic set closely matching the at least one document service characteristic of the selected document service and the at least one target document service characteristic specified by the at least one application.

6. The method of claim 2, wherein:
    the document service characteristics of the selected document service describe a set of resources comprising the selected document service; and
    respective runtimes, responsive to a request from the at least one application to describe the selected document service, present the set of resources comprising the selected document service to the at least one application.

7. The method of claim 6, wherein the set of resources further comprises:
    at least one user account through which the selected document service is accessed;
    at least one access permission associated with the at least one user account with the selected document service;
    at least one document set comprising at least one document of the selected document service;
    at least one partition distributing the document set across at least one document server; and
    at least one endpoint associated with at least one resource of the selected document service.

8. The method of claim 6, wherein:
    respective resources of the set of resources identified by a resource uniform resource identifier; and
    the selected runtime interacts with the selected document service by submitting requests to endpoints of the selected document service, wherein respective endpoints are identified by the selected document service according to an access uniform resource identifier and identifying respective resources involved in the request by a resource uniform resource identifier.

9. The method of claim 1, wherein:
    the device storage runtime accesses the requested document through an interprocess communication channel; and
    the local storage runtime and the remote storage runtime access the requested document through a network communication channel.

10. The method of claim 1, wherein:
    the performance characteristics utilized by the device storage runtime include accessing documents using a basic availability, soft state, and eventual consistency (BASE) transaction model; and the performance characteristics utilized by the local storage runtime and the remote service runtime include accessing documents using an atomic, consistent, isolated, and durable (ACID) transaction model.

11. The method of claim 1, wherein:
the performance characteristics utilized by the device storage runtime include accessing documents using a file system of the device;
the performance characteristics utilized by the local storage runtime include accessing documents through a local area network file sharing protocol; and
the performance characteristics utilized by the remote storage runtime include accessing documents through a network address model.

12. The method of claim 1, wherein:
the performance characteristics utilized by the device storage runtime include retrieving documents directly from document services;
the performance characteristics utilized by the local storage runtime include retrieving documents through a performance-facilitating cache; and
the performance characteristics utilized by the remote storage runtime including retrieving documents through a resource-conserving cache.

13. The method of claim 1, wherein:
the performance characteristics of the device storage runtime include accessing documents through a first encryption mechanism;
the performance characteristics of the local storage runtime include accessing documents through a second encryption mechanism that is stronger than the first encryption mechanism; and
the performance characteristics of the remote storage runtime include accessing documents through a third encryption mechanism that is stronger than the second encryption mechanism.

14. The method of claim 1, wherein:
the performance characteristics of the local storage runtime and the remote storage runtime include performing an authentication of the request to access the requested document; and
the performance characteristics of the device storage runtime include refraining from performing an authentication of the request to access the requested document.

15. The method of claim 1, wherein:
the performance characteristics of the device storage runtime include participating in at least one administrative task of the selected document service; and
the performance characteristics of the remote storage service runtime include refraining from participating in administrative tasks of the selected document service.

16. The method of claim 1, wherein:
respective runtimes comprising an application interface that fulfills requests from the applications to access document services; and
executing the instructions further causes the device to, additional to invoking the selected runtime for the context, connect the at least one application to the application interface of the selected runtime.

17. The method of claim 1, wherein:
respective runtimes generate a runtime session; and
executing the instructions further causes the device to, responsive to a transition from a first context during a current runtime session generated by a first selected runtime to a second context that is different from the first context:
select from the runtime set a second selected runtime that is associated with the second context; and
invoke the second selected runtime with the current runtime session generated by the first selected runtime for the second context of the selected document service.

18. The method of claim 17, wherein detecting the transition comprising:
during the current runtime session, monitoring at least one performance characteristic of the current runtime session; and
responsive to a change in the at least one performance characteristic of the current runtime session, identifying the transition from the first context to the second context.

19. A system for interfacing applications, on a device having a processor, with documents, the system comprising:
a memory on the device that stores instructions that, when executed by the processor, provide:
a runtime set comprising runtimes that respectively access documents according to performance characteristics that are specific to a context including a location of each document relative to the device, wherein the runtimes comprise:
a device storage runtime that accesses documents according to performance characteristics for documents that are stored on the device;
a local storage runtime that accesses documents according to performance characteristics for documents that are accessible to the device over a local-area network; and
a remote storage runtime that accesses documents according to performance characteristics for documents that are accessible to the device over a wide-area network; and
a runtime selector comprising instructions stored on the device that, when executed by the processor, cause the device to fulfill a request from at least one of the applications to access a document by:
identifying, by the device, a context of the requested document including a location of the requested document relative to the device; and
invoking, by the device, a selected runtime of the runtime set associated with the context including the location of the requested document relative to the device to access the requested document.

20. A device that executes applications interfacing with documents, the device comprising:
a processor; and
a memory storing:
a runtime set comprising runtimes that respectively access documents according to performance characteristics that are specific to a context including a location of each document relative to the device, wherein the runtime set comprises:
a device storage runtime that accesses documents according to performance characteristics for documents that are stored on the device;
a local storage runtime that accesses documents according to performance characteristics for documents that are accessible to the device over a local-area network; and
a remote storage runtime that accesses documents according to performance characteristics for documents that are accessible to the device over a wide-area network; and a runtime selector comprising instructions stored on the device that, when executed by the processor, cause the device to fulfill a request from at least one of the applications to access a document by:
- identifying, by the device, a context of the requested document including a location of the requested document relative to the device; and
- invoking, by the device, a selected runtime of the runtime set associated with the context including the location of the requested document relative to the device to access the requested document.

* * * * *